United States Patent [19]

Fujita et al.

[11] Patent Number: 5,519,697
[45] Date of Patent: May 21, 1996

[54] ISDN-SERVED CELL-SITE STATIONS WITH MEANS FOR DISTRIBUTING CALLS TO MOBILE SWITCHING SYSTEMS

[75] Inventors: Kousaku Fujita; Masahiko Yahagi, both of Tokyo, Japan

[73] Assignee: NEC Corporation, Tokyo, Japan

[21] Appl. No.: 284,781

[22] Filed: Aug. 2, 1994

[30] Foreign Application Priority Data

Aug. 2, 1993 [JP] Japan .................................. 5-191394

[51] Int. Cl.$^6$ ...................................................... H04Q 7/22
[52] U.S. Cl. ........................... 370/58.3; 370/68.1; 379/60; 455/56.1
[58] Field of Search ................................ 379/59, 60, 63; 455/33.1, 34.2, 53.1, 54.1, 56.1; 370/16, 54, 55.3, 68.1, 95.1, 110.1

[56] References Cited

U.S. PATENT DOCUMENTS

| | | | |
|---|---|---|---|
| 4,989,231 | 1/1991 | Ishikawa | 379/59 |
| 5,363,428 | 11/1994 | Nagashima | 455/56.1 |
| 5,379,448 | 1/1995 | Ames et al. | 455/34.2 |

OTHER PUBLICATIONS

EIA Interim Standard, "Cellular System Mobile Station-Land Station Compatibility Specification", IS-3-D, Preface, Notes, Table of Contents and pp. 1-59 (68 pages total), (Mar. 1987).

Primary Examiner—Benedict V. Safourek
Attorney, Agent, or Firm—Foley & Lardner

[57] ABSTRACT

In a cellular communication system where mobile telephone switching offices (MTSO) are connected to an ISDN, traffic data is sent from each MTSO at intervals to cell-site base stations via ISDN, indicating a volume of calls received during a predetermined time interval by the MTSO from the base stations and a volume of calls transmitted from the MTSO to the base stations during the same time interval. Each base station analyzes the transmitted traffic data to produce percentage values representing the capacities of the MTSOs for receiving calls from the base stations. When the base station receives a call from a mobile station, it generates a routing code according to the percentage values, and transmits it with the destination address of the call to the ISDN, where it is translated so that the call is routed to one of the mobile switching systems identified by the routing code.

7 Claims, 4 Drawing Sheets

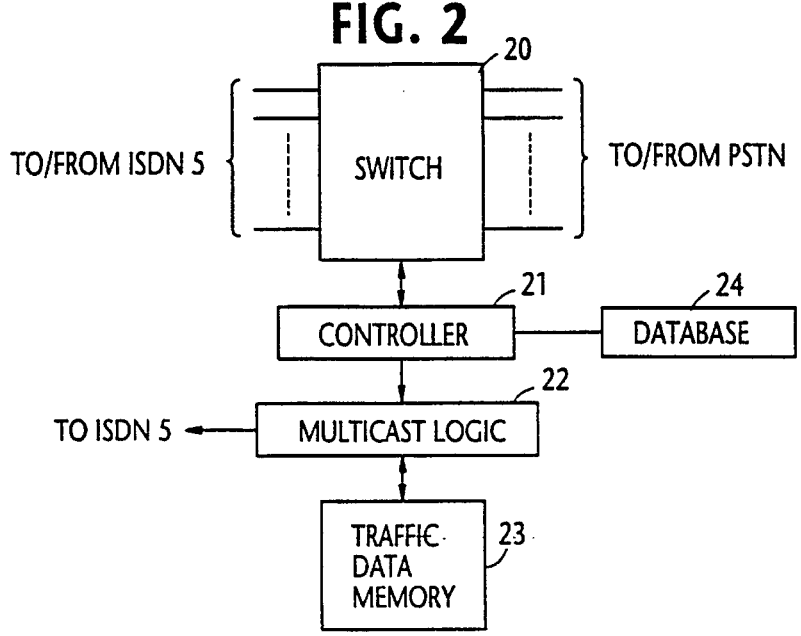
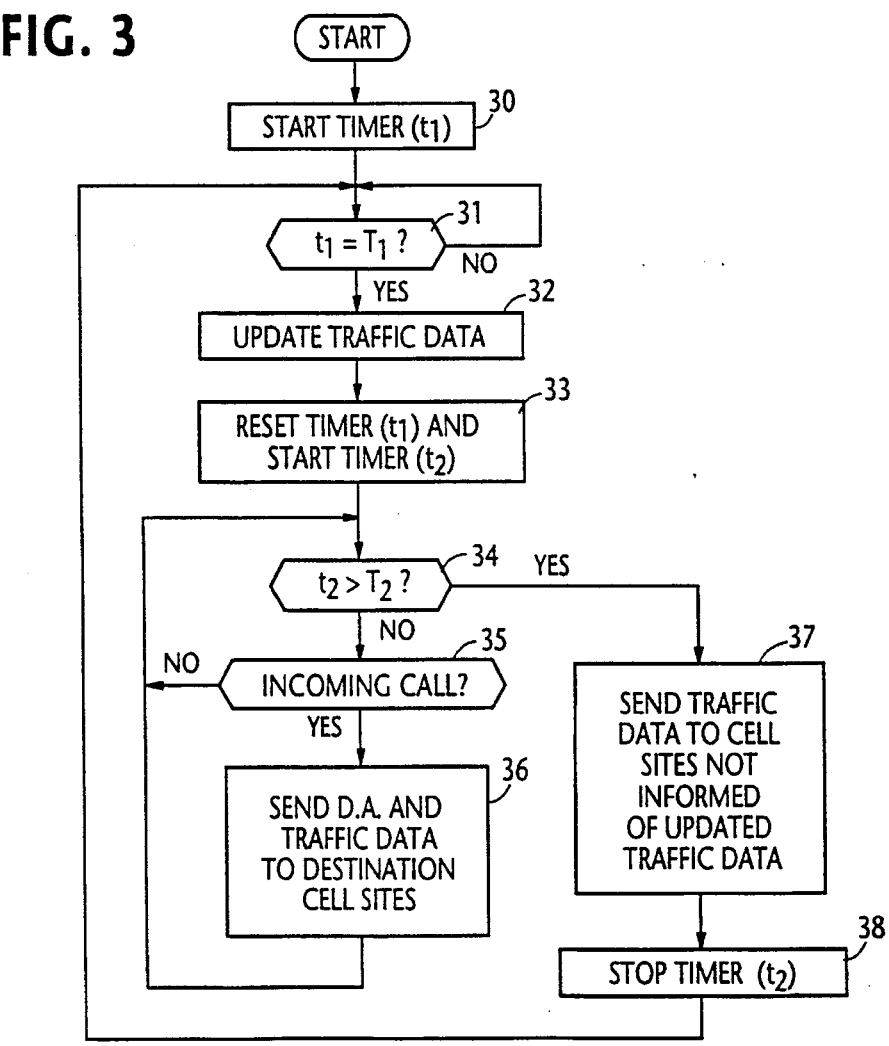

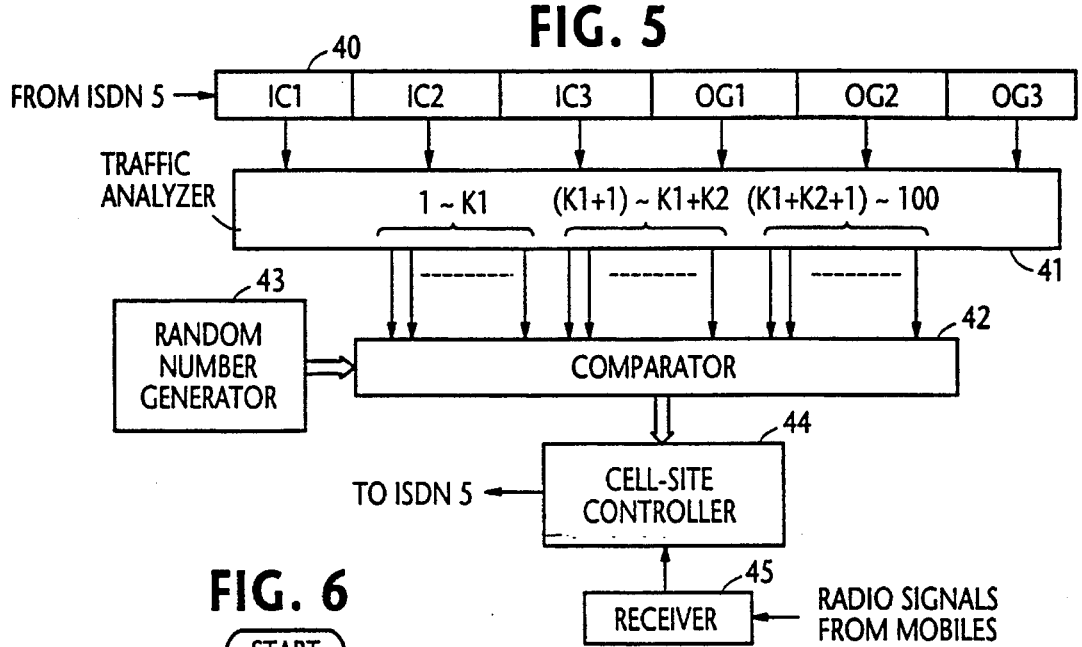
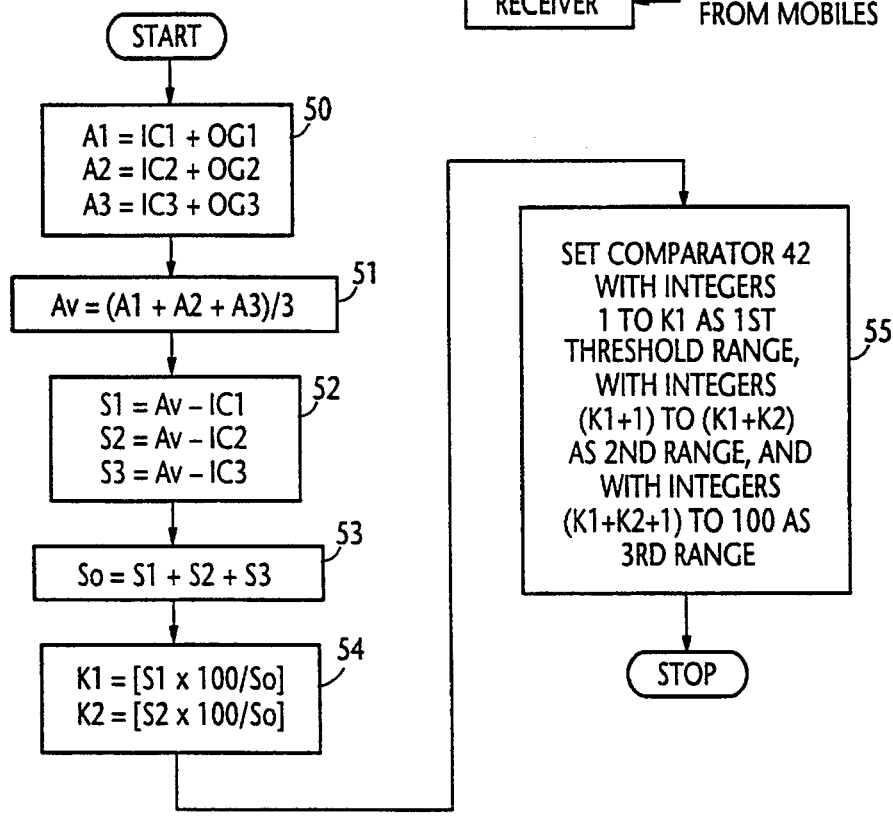
| | ICi | OGi | Ai | Av | Si | Ki | THRESHOLD RANGES | |
|---|---|---|---|---|---|---|---|---|
| MTSO 1 | 75 | 4 | 79 | 79 | 4 | 4 | 1 ~ K1 | (= 1 ~ 4) |
| MTSO 2 | 30 | 55 | 85 | 79 | 49 | 53 | (K1+1) ~ (K1 + K2) | (= 5 ~ 57) |
| MTSO 3 | 40 | 33 | 73 | 79 | 39 | (43) | (K1+K2+1) ~ 100 | (= 58 ~ 100) |
| So | | | | | 92 | | | |

ISDN-SERVED CELL-SITE STATIONS WITH MEANS FOR DISTRIBUTING CALLS TO MOBILE SWITCHING SYSTEMS

BACKGROUND OF THE INVENTION

1. Field of the Invention

The present invention relates generally to cellular mobile communication systems, and more particularly to a communications system in which cell-site base stations are connected via an ISDN (integrated services digital network) to one of mobile telephone switching systems.

2. Description of the Related Art

In a cellular communication system in which cell-site base stations and mobile telephone switching offices (MTSO) are connected to an ISDN, each of the MTSOs is associated with a corresponding group of the base stations so that mobile calls from the base stations of the same group are all routed to the corresponding MTSO. Because of the different incoming traffic patterns of cell-site groups, the MTSOs have different capacities for handling outgoing calls. As a result, some of the MTSOs where incoming calls account for a substantial proportion of their capacity, they are excessively overloaded with outgoing calls from the corresponding base stations. Because of the one-to-one correspondence between the cell-site groups and the MTSOs, the outgoing traffic patterns of the MTSOs cannot be altered according to their incoming traffic patterns.

To solve this problem, a proposal has been made in the EIA Interim standard Cellular System Mobile Station-Land Station Compatibility Specification 15-3-d, March 1987, that a request for call should be denied if an MTSO is overloaded. However, since this denial approach is performed without taking account the traffic patterns of the other MTSOs which are connected to the same ISDN, it does not represent the fundamental solution.

SUMMARY OF THE INVENTION

It is therefore an object of the present invention to provide a technique for distributing calls from cell-site base stations to one of mobile switching systems via ISDN according to their call handling capacities.

According to the present invention, there is provided a cellular communication system which comprises an ISDN network, a plurality of mobile switching systems connected to the ISDN network and a plurality of cell-site base stations connected to the ISDN network for establishing communication paths between mobile stations and one of the mobile switching systems via the ISDN network. Each mobile switching system transmits traffic data at intervals to the cell-site base stations via the ISDN network, indicating a volume of calls received during a predetermined time interval by the mobile switching system from the base stations and a volume of calls transmitted from the mobile switching system to the base stations during the same time interval. Each base station then analyzes the traffic data from the mobile switching systems, and generates a routing code according to the analyzed traffic data, and transmits the routing code, on receiving a call from a mobile station, to the ISDN network so that the routing code is translated by the ISDN network and the call is routed to one of the mobile switching systems identified by the routing code.

BRIEF DESCRIPTION OF THE DRAWINGS

The present invention will be described in further detail with reference to the accompanying drawings, in which:

FIG. 2 is a schematic block diagram of each of the mobile telephone switching offices according to the present invention;

FIG. 3 is a flowchart of operations performed by the multicast logic unit of each of the mobile telephone switching offices;

FIG. 5 is a schematic block diagram illustrating part of each base station of the present invention;

FIG. 6 is a flowchart for analyzing the traffic data received by each base station; and FIG. 7 is a table showing a typical example of analyzed traffic data.

DETAILED DESCRIPTION

Figure 1:
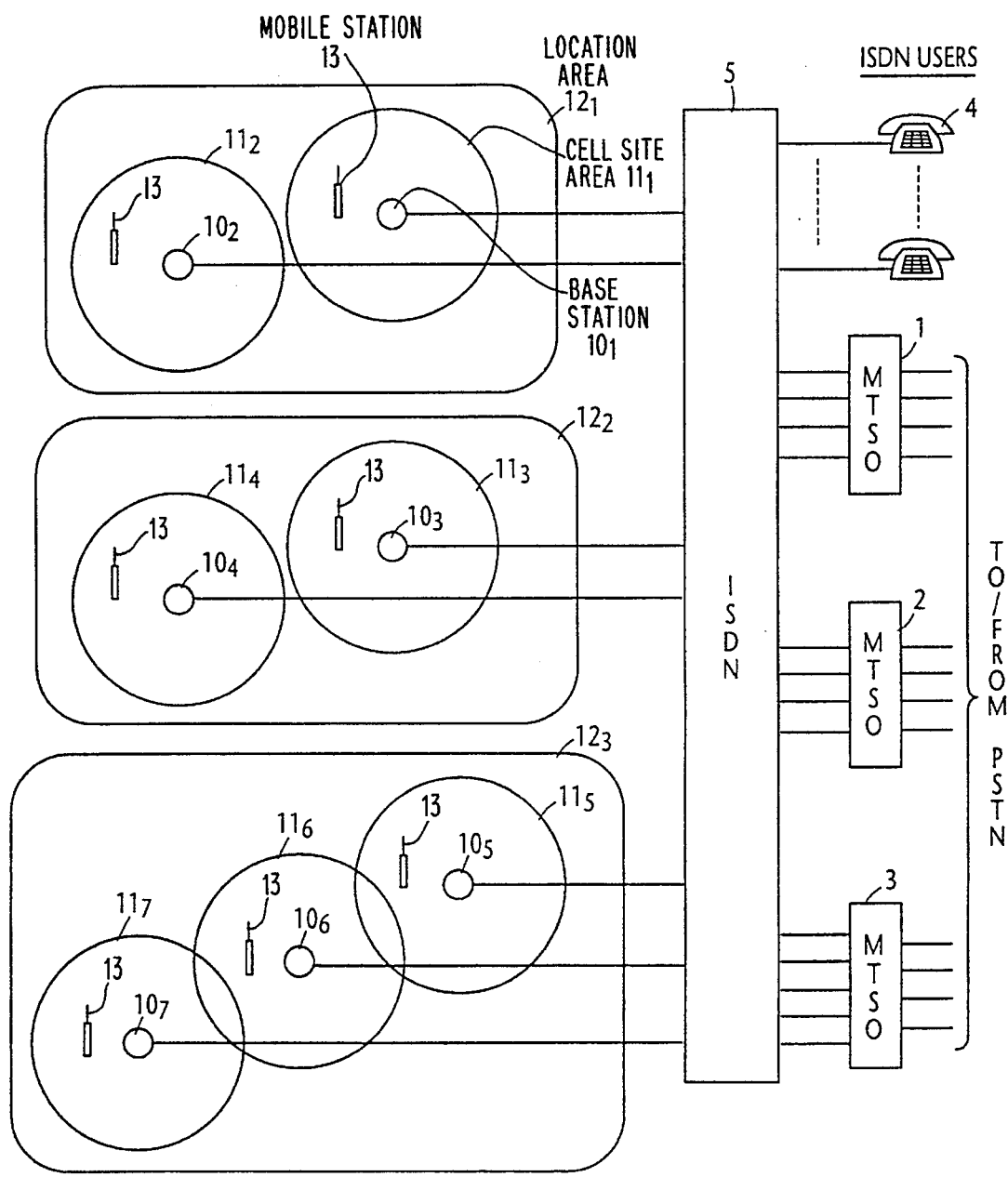
FIG. 1 is a block diagram of a communication network of the present invention, illustrating a plurality of cell-site base stations and mobile telephone switching offices connected to an ISDN network.

Referring now to FIG. 1, there is shown an exemplary communication network in which the present invention is embodied. The network is made up of a plurality of cell-site base stations 10 which are connected to an ISDN network 5 as ISDN users to which mobile telephone switching offices (MTSO) 1, 2 and 3 and a great number of ISDN user terminals 4 are also connected. MTSOs 1, 2 and 3 are further connected to the public switched telephone network (PSTN), not shown, which may be ISDN or or traditional analog network. Communication paths are established between any of the cell-site stations and any of mobile switching offices 1 to 3 through the ISDN network 5.

Cell-site base stations $10_1$ to $10_7$ are covering its own cell-site areas $11_1$ to $11_7$ which are grouped together according to their relative locations to form location areas $12_1$ to $12_3$, each with its own identity number. This number is then transmitted regularly from all base stations. A mobile station 13, when not engaged in a call, will lock on to the control channel of the nearest base station $10_1$ and, as it moves about the network, will from time to time select a new base station to lock in to. The mobile station Will check the area identity number transmitted by the base station, and when it detects a change, indicating that the mobile station has moved to a new location area, it will automatically inform the network of its new location by signalling its identity number to the base station, which, in turn relays the mobile's identity number to a predetermined one of the MTSOs 1, 2 and 3. In this way, each MTSO can keep a record (registration) of the current location area of each mobile station.

As shown in FIG. 2, each MTSO includes a switch 20, a switching controller 21 for establishing a path in the switch 20, and a database 24 to which the controller is connected. Database 24 contains registration data mapping the relationships between mobile stations and those of the location areas $12_1$, $12_2$ and $12_3$ in which the mobile stations are currently located. According to the present invention, a multicast logic unit 22 is connected to the controller 21. As illustrated in FIG. 3, the multicast logic 22 is programmed to perform the updating of a traffic data memory 23 at periodic intervals and provide a multicast of the updated traffic data to all cell-site stations by way of the ISDN network.

The control algorithm of the multicast logic 22 is illustrated in FIG. 3. The multicast logic 22 of each MTSO starts program execution with step 30 which initially starts a timer $t_1$. Exit then is to step 31 to check to see if time $t_1$ is equal to a periodic time interval $T_1$. If the answer is affirmative, control branches at step 30 to step 31 to update the traffic data memory 23 with data of incoming and outgoing calls which are handled by the controller 21 during a previous period $T_1$. At step 33, multicast logic 22 resets timer $t_1$ and starts a timer $t_2$. At decision step 34, control checks to see if $t_2$ is greater than a predetermined interval $T_2$, which is smaller than $T_1$. If $t_2$ is smaller than $T_2$, control proceeds to decision step 35 to determine whether there is an incoming call received from one of the MTSOs. If the answer is affirmative, control advances to step 36 to send the destination address (D.A.) of the incoming call and the updated traffic data stored in the memory 23 to all the cell-site stations of the destination location area, and returns to step 34 to repeat the process. If $t_2$ becomes greater than $T_2$, control proceeds to step 37 to send the updated traffic data to those cell-site stations not informed of the updated traffic data. At step 38, timer $t_2$ is stopped and control returns to step 31 to repeat the traffic data update and transmission.

Figure 4:
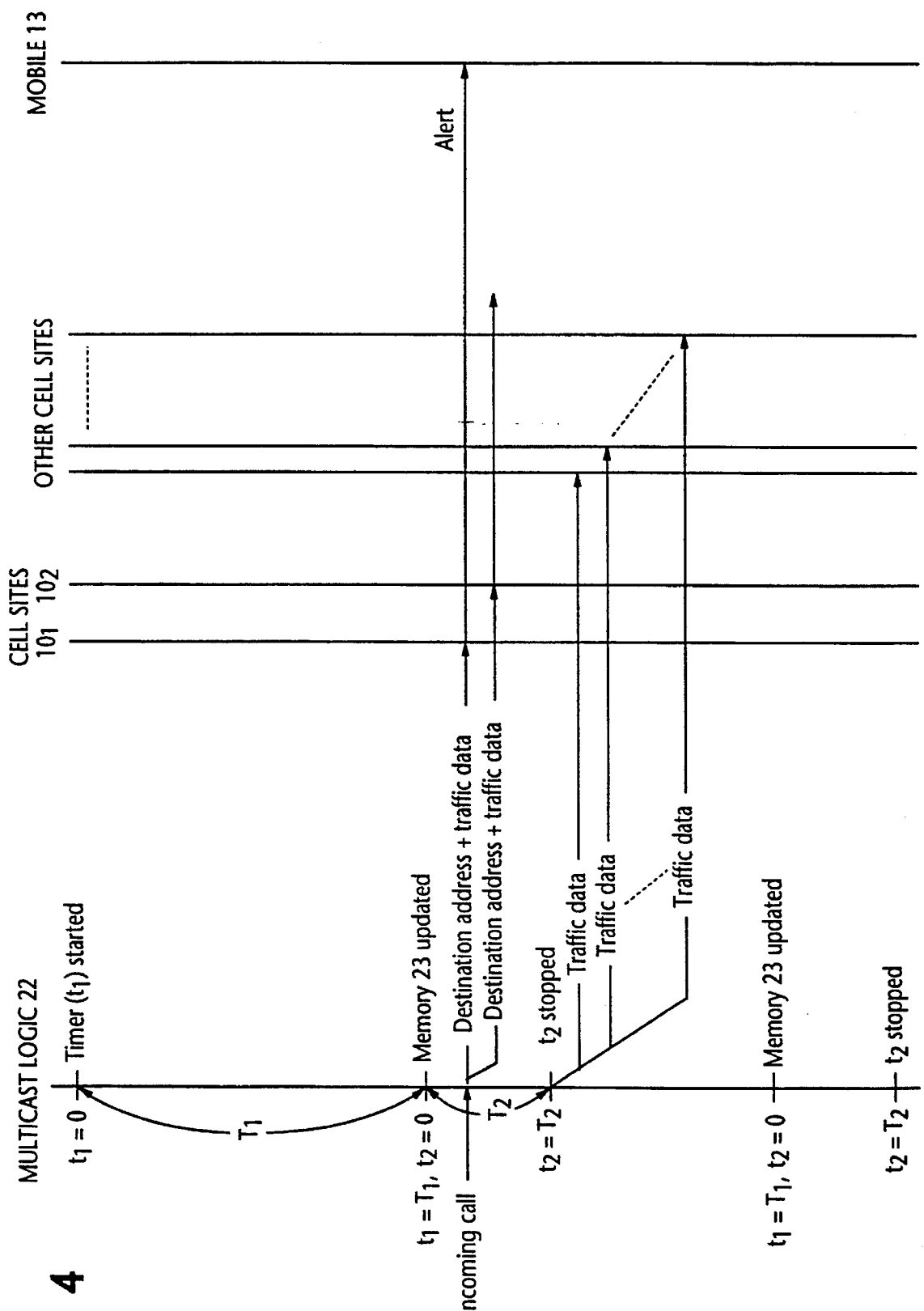
FIG. 4 is a time sequence diagram associated with the flowchart of FIG. 3.

As shown in FIG. 4, the contents of traffic data memory 23 are updated at intervals $T_1$. If an incoming call destined to the mobile station 13 is received during the interval $T_2$, immediately following the updating of the memory 23, control will branch at step 35 to operations step 36 to receive the destination address of the incoming call from the switching controller 22 and reads the updated traffic data from memory 23 and sends the traffic data via the ISDN to the base stations $10_1$ and $10_2$ identified by the registration record of database 24. Both of these cell-site stations receive and store the transmitted traffic data for purposes of analysis and send an alert message to the mobile station 13. When $t_2=T_2$, the updated traffic data is sent to the cell-site stations not informed of the updated traffic data (step 37) and the timer $t_2$ is stopped (step 38). During intervals other than $T_2$, all incoming calls destined to any of the cell site stations are handled by the switching controller 21 in the usual manner.

As illustrated in FIG. 5, each cell-site station includes a register 40 and a traffic analyzer 41. Register 40 receives the traffic data from the ISDN 5. The traffic data contains incoming traffic data IC1, IC2 and IC3 which are respectively representative of the counts of incoming calls (base-to-mobile) received from MTSO 1, 2, and 3, respectively, and OG1, OG2 and OG3 which are respectively representative of the counts of outgoing calls (mobile-originated) OG1, OG2 and OG3 received by MTSO 1, 2 and 3, respectively. Traffic analyzer 41 receives the call count values from the register 40, analyzes this traffic data and selects one of the MTSOs to which an outgoing call from each mobile station is to be routed.

Traffic analyzer 41 performs logic operations according to the flowchart shown In FIG. 6. At step 50, ICi and OGi (where i=1, 2, 3) are summed together to produce a set of sums Ai, and an average value of the sums Ai is obtained at step 51. At step 52, each incoming call count ICi is subtracted from the average value Av to obtain a difference value Si.

The significance of this subtraction for a MTSO is that, since the destinations of mobile-destined traffic of the MTSO (which is outgoing as viewed from the MTSO) cannot be altered and their volume accounts for a substantial portion of the total call handling capacity of the MTSO, the difference value Si serves an index that represents its remaining capacity for handing mobile-originated calls without causing excessive overload on the MTSO.

At step 53, a total So of the difference indices Si is obtained, and at step 54, S1 is multiplied by "100" and divided by the total value So to give a rounded percentage value K1 for MTSO 1 and S2 is multiplied by "100" and divided by the total value So to give a rounded percentage value K2 for MTSO 2. At step 55, comparator 42 is set with integers "1" to K1 as a first threshold range, with integers (K1+1) to (K1+K2) as a second threshold range, and with integers (K1+K2+1) to "100" as a third threshold range. The first, second and third threshold ranges indicate the amounts of mobile originated traffic that can be received by MTSOs 1, 2 and 3, respectively.

Connected to the comparator 42 is a random number generator 43 that supplies to it a randomly generated integer varying in the range between integer "1" and integer "100". Comparator 42 compares the random number with the integers of each range and determines which one of these ranges the random number falls in and generates a routing code indicating the MTSO corresponding to the determined range. Therefore, the random number falls in one of these ranges in proportion to their ranges, so that the MTSO having the greatest range has the highest probability of receiving calls from mobile stations located in any of the location areas $12_1$, $12_2$ and $12_3$.

The routing code generated by comparator 42 is supplied to a cell-site controller 44 where it is appended to the destination address of a call initiated from a mobile station which is supplied from a receiver 45 and transmitted to the ISDN 5. The routing code is used by the ISDN routing facility for switching the call to one of the MTSOs which is identified by the routing code.

A typical example of traffic data received by a base station is shown in FIG. 7, in which incoming call counts IC1, IC2, IC3 are assumed to be equal to "75", "30" and "40", respectively, and outgoing call counts OG1, OG2 and OC3 are "4", "55" and "33", respectively, thus giving totals A1, A2 and A3 as "79", "85" and "73", respectively. An average value Av is equal to "79", thus giving difference values S1, S2 and S3 of "4", "49" and "39", respectively. Bounded percentage values K1 and K2 of "4" and "53" are respectively obtained and first, second and third threshold ranges are given as 1 to 4, 5 to 57 and 58 to 100, respectively. It is seen that MTSO 2 has the highest probability of receiving calls from mobile stations and MTSO 1 the least probability. In this way, all calls from mobiles are distributed among the MTSOs according to their capacities of handling outgoing calls.

The foregoing description .shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A cellular communication system comprising:

an ISDN (integrated services digital network) network;

a plurality of mobile switching systems connected to said ISDN network;

a plurality of cell-site base stations connected to said ISDN network for establishing communication paths between mobile stations and one of the mobile switching systems via said ISDN network;

each of said mobile switching systems including means for transmitting traffic data at intervals to said cell-site base stations via said ISDN network, said traffic data indicating a volume of calls received during a predetermined time interval by the mobile switching system from the cell-site base stations and a volume of calls transmitted from the mobile switching system to the cell-site base stations during said predetermined time interval;

each of said cell-site base stations including means for analyzing the traffic data transmitted from said mobile switching systems, means for generating a routing code according to the analyzed traffic data, and means for transmitting the routing code, on receiving a call from a mobile station, to said ISDN network so that the routing code is translated by the ISDN network and the call is routed to one of said mobile switching systems identified by the routing code.

2. A cellular communication system as claimed in claim 1, wherein said means for analyzing the traffic data comprises means for deriving a plurality of ranges corresponding respectively to said mobile switching systems, each of said ranges containing integers of successively different values and representing capacities of said mobile switching systems for handling calls from said cell-site base stations, and wherein said means for transmitting the routing code comprises means for generating a random number and means for comparing said random number with the integers of each of said ranges and generating said muting code when said random number falls in one of said ranges.

3. A cellular communication system as claimed in claim 1, wherein the transmitting means of each of said mobile switching systems includes means for providing a multicast of said traffic data to the cell-site base stations.

4. A cellular communication system as claimed in claim 1, wherein each of said mobile switching systems includes means for updating said traffic data at intervals, transmitting said traffic data together with a call destined to one of said cell-site base stations when said call is received within a specified time interval following the updating of said traffic data, and transmitting said traffic data upon expiration of said specified time interval to the cell-site base stations to which the traffic data is not transmitted within said specified time interval.

5. A cellular communication system as claimed in claim 4, wherein each of the mobile stations is identified by a unique identity number, said cell-site base stations are divided into a plurality of groups and the cell-site base stations of each group are located respectively in one of a plurality of location areas each having a unique identity number, said cell-site base stations of each group transmitting the unique identity number of the location area in which the cell-site base stations are located to allow each of the mobile stations to detect a change in location of the mobile station and transmit back the identity number of the mobile station, each of the cell-site base stations relaying the identity number of the mobile station to a predetermined one of said mobile switching systems for keeping a record of the location area in which said mobile station is currently located, wherein the transmitting means of each of the mobile switching systems comprises means for providing a multicast of said traffic data to the cell-site base stations located in one of said location areas according to said record together with a destination address of a call when the call is received within said specified time interval.

6. In a cellular communication system comprising:

an ISDN (integrated services digital network) network;

a plurality of mobile switching systems connected to said ISDN network for directing calls from a public switched network to the ISDN network and directing calls from the ISDN network to the public switched network; and a plurality of cell-site base stations connected to said ISDN network for establishing communication paths between mobile stations and one of the mobile switching systems via said ISDN network, a method comprising the steps of:

a) transmitting traffic data from each of said mobile switching systems at intervals to said cell-site base stations via said ISDN network, said traffic data indicating a volume of calls received during a predetermined time interval by the mobile switching system from the cell-site base stations and a volume of calls transmitted from the mobile switching system to the cell-site base stations during said predetermined time interval;

b) receiving, at each of said cell-site base stations, the traffic data transmitted from said mobile switching systems;

c) analyzing the received traffic data and generating a plurality of percentage values corresponding respectively to said mobile switching systems, each of said percentage values representing a capacity of the corresponding mobile switching systems for receiving calls from the cell-site base stations; and d) receiving, at one of the cell-site base stations, a call from a mobile station and routing the call via said ISDN network to one of said mobile switching systems according to said percentage value.

7. A method as claimed in claim 6, wherein the percentage values are represented by a plurality of ranges of integers, the step (d) comprises the steps of:

generating a random number;, comparing said random number with the integers of each of said ranges and generating a routing code when said random number falls in one of said ranges for identifying one of said mobile switching systems; and transmitting the routing code, on receiving said call from the mobile station, to said ISDN together with a destination address of the call.

* * * * *